United States Patent
Chelchowski et al.

(10) Patent No.: US 6,702,336 B1
(45) Date of Patent: Mar. 9, 2004

(54) COUPLING DEVICE FOR POLYMERIC PIPES

(76) Inventors: David Chelchowski, 79 Jetty Rd., Largs Bay South Australia 5016 (AU); Geoffrey Puckett, 27 Slade Crescent, Hallet Cove, South Australia 5158 (AU)

(*) Notice: Subject to any disclaimer, the term of this patent is extended or adjusted under 35 U.S.C. 154(b) by 0 days.

(21) Appl. No.: 10/231,663

(22) Filed: Aug. 29, 2002

(51) Int. Cl.⁷ .............................................. F16L 19/06
(52) U.S. Cl. ........................ 285/343; 285/342; 285/245; 285/249
(58) Field of Search .................. 285/342, 343, 285/382.7, 245, 246, 334.5, 249

(56) References Cited

U.S. PATENT DOCUMENTS

| | | | | |
|---|---|---|---|---|
| 1,581,538 A | * | 4/1926 | Hill | 285/342 |
| 2,437,632 A | * | 3/1948 | Wolfram | 285/342 |
| 3,498,647 A | * | 3/1970 | Schroder | 285/343 |
| 4,037,864 A | * | 7/1977 | Anderson et al. | 285/342 |
| 4,529,231 A | * | 7/1985 | Greenawalt | 285/342 |
| 5,230,539 A | | 7/1993 | Olson | |
| 5,593,186 A | | 1/1997 | Harris | |
| 6,145,893 A | * | 11/2000 | Kuo | 285/302 |
| 6,378,915 B1 | * | 4/2002 | Katz | 285/342 |
| 6,464,267 B1 | * | 10/2002 | Egozi | 285/342 |

FOREIGN PATENT DOCUMENTS

| | | |
|---|---|---|
| EP | 0201288 B1 | 11/1996 |
| FR | 2269020 | 11/1975 |
| WO | WO 9810212 | 3/1998 |

* cited by examiner

Primary Examiner—David Bochna
(74) Attorney, Agent, or Firm—Francis Law Group (57) ABSTRACT

A pipe coupling, wherein a pipe is freely insertable into the coupling and a nut causes engagement of a grip ring and gasket with the pipe to provide a seal between the coupling and the pipe, having a stop disposed therein to indicate to a user that the pipe has been inserted to a first position. Further tightening of the nut causes the pipe to move further into the coupling to a second position beyond the stop.

10 Claims, 5 Drawing Sheets

COUPLING DEVICE FOR POLYMERIC PIPES

This application is a continuation of U.S. appilication Ser. No. 10/231,663, filed Aug. 29, 2002, now abandoned, which was the National Stage Application of International Application No. PCT/AU01/01665, filed Dec. 21, 2001, which claims priority from Australia Application No. PR2231, filed Dec. 21, 2000.

FIELD OF THE INVENTION

The present invention relates to coupling systems for securing pipes. More particularly, the invention relates to a coupling device for polymeric pipes, wherein a pipe is inserted into the coupling device to a first position and wherein tightening of the coupling device causes the pipe to be drawn further into the coupling device.

BACKGROUND OF THE INVENTION

Polymeric pipe couplings are well known and typically include a body, nut, and grip ring. A pipe is inserted into the body. Tightening of the nut compresses the grip ring that in turn engages the pipe. Further tightening of the nut causes urging of the pipe further into the body. A typical coupling is described and illustrated in our U.S. Pat. No. 5,593,186 entitled "Coupling for Outer Surface Engagement of Polymeric Pipe". The described coupling is adapted for engagement with the outer surface of a polymeric pipe. The coupling includes a sub-assembly of a compression sleeve, a resilient gasket ring permanently attached to the inner end of the compression sleeve, a gripping member and a nut. The gasket ring encounters an abutment in a socket in the body as the nut is tightened, and further tightening of the nut radially compresses the grip ring member so that its inwardly directed barbed projections engage the outer surface of a pipe to which the coupling is attached. The end of the pipe is freely insertable through the gripping member and sleeve and into the socket in the body. There are also provided abutment surfaces within the body coupling and the nut that abut inner and outer surfaces of a flange outstanding from the outer end of the compression sleeve. Also disclosed is an embodiment with a transition spigot having a barbed tail inserted into an end of a pipe enabling the coupling to accommodate a range of similar but different diameter pipes.

The coupling described in the aforesaid specification and other earlier couplings have proven to be very successful, both technically and commercially. Failure is almost unknown and in some areas of the world fittings made in accordance with that specification have achieved great success.

A practical problem which is frequently encountered with couplings made in accordance with said U.S. Pat. No. 5,593,186 (and other fittings having in common a gripping member and a tightening nut), is that when the nut has been partially tightened it radially compresses the gripping member causing the inwardly directed barbed projections to engage the outer surface of a pipe to which the coupling is attached. Further tightening of the nut then results in the pipe being urged in the direction of the nut travel along its longitudinal axis due to the force exerted on the pipe by the barbed projections. But, because the pipe is typically inserted into the coupling until its end abuts against an abutment surface, there is no additional room for the pipe to move into. As the nut is further tightened, the pipe is subject to significant forces that result in its deformation and leads to changes in the flow of the fluid through the pipe. Further, the rotation of the nut requires more and more torque to effect the appropriate compression on the seal, and at times, it may be incorrectly assumed that the nut is fully tightened due to the resistive forces of pipe leading to couplings that leak.

It is therefore an object of the present invention to provide for a coupling whereby when the pipe is inserted into the coupling it is caused to be held at a first location, and whereby when the coupling nut is further tightened the pipe is caused to be drawn further towards a second location.

It is a further object of the present invention to provide for a coupling that allows manual insertion of the pipe and that prevents the pipe from being inserted too far into the coupling.

There is currently no prior art known to the applicant whereby a pipe is caused to abut a coupling at a first location and whereby further tightening of the coupling nut will cause the pipe to be drawn towards a second location.

BRIEF SUMMARY OF THE INVENTION

In accordance with the above objects and those that will be mentioned and will become apparent below, the coupling device in accordance with this invention comprises a body having an external thread and annular inner surfaces defining a socket within the body of larger outer diameter at an outer end than at an intermediate location of said socket; a stop extending at least partially around the annular inner surface in the intermediate location of said socket at a position offset from the end of said intermediate location where the end is distal from said outer end; a nut In preference, the projections are wedge shaped projections whose longitudinal direction extends in the longitudinal direction of the coupling. Preferably, the front surface of the wedge facing the outer end is disposed at an angle other than a right angle but greater than 45 degrees to the longitudinal axis. In a preferred embodiment, the front surface has at least two faces whose angle to the longitudinal axis is less than 90 degrees. having an internal thread at an inner end thereof engaging said body external thread, an inwardly facing abutment surface between ends of said nut, and an outwardly converging internal circular surface between said abutment surface and an outer end of said nut; an annular sleeve having an abutment surface at is outer end co-operable with said nut abutment surface, and a resilient gasket secured to its inner end; a deformable gripping member having an outwardly converging outer surface complementary to said outwardly converging internal nut surface, the gripping member having an internal surface with barbs extending radially inwardly therefrom; internal diameters of said socket inner end, sleeve and gripping member all being slightly greater than an external diameter of a pipe to which said coupling is securable, such that an end of said pipe is freely insertable through said gripping member and into said socket intermediate part until it abuts the stop, and tightening of said nut over said external thread causes axial movement of said gasket ring, sealable engagement of said gasket ring and said body, radially inward deformation of said gripping member such that the said barbs clamp said pipe, and axial movement of said pipe over the stop and towards the end of said intermediate location.

The use of the stop assists in properly coupling the pipe. A user inserts the pipe into the coupling to a location where they can feel resistance to the pipe moving further into the coupling. This position then still provides the pipe with room to move inwardly into the pipe as it does when the nut is tightened. In this way, since the pipe is not inserted too deeply into the coupling its end is not caused to deform under tightening of the nut.

In one embodiment of the invention, the stop is an annular abutment surface extending circumferentially around the annular inner surface. Preferably, the stop is a plurality of projections positioned circumferentially and symmetrically around the inner annular surface.

In preference there are at least three projections disposed 120 degrees angularly to each other. Preferably the height of the projections is at least equal to the thickness of the pipe.

Advantageously, the projections are wedge shaped projections whose longitudinal direction extends generally perpendicular to the longitudinal direction of the coupling.

Advantageously, the wedge shaped projections are of an arcuate shape.

In a further embodiment of the invention, the pipe coupling is of the type where a pipe is freely insertable into the coupling and includes a body having annular inner surfaces and external threads; a nut having internal threads adapted to engage said body; a grip ring disposed within the body and of a shape and configuration that rotation of the nut causes it to move in both the axial and longitudinal direction, said nut having projections adapted to engage said pipe when the nut is tightened and having an end adapted to engage a gasket and move it into a sealing cavity when the nut is tightened, wherein said body includes an abutment surface located at a position away form the ends of said body to provide a guide to the user when inserting the pipe freely into the coupling and where the abutment surface is of a shape and configuration such that under rotation of the nut the pipe is caused to move over said abutment surface and further into said coupling.

Thus, the present invention provides for an improved pipe coupling where there is a mechanism to indicate to a user that a pipe has been sufficiently inserted into the coupling whilst there still remaining room for the pipe to move axially inwardly into the coupling as it does under the forcing of the grip ring.

The typical coupling to which the present invention can be applied includes a gripping member and a sub-assembly of a compression sleeve and resilient gasket ring generally attached to the inner end of the compression sleeve. A pipe end is freely insertable through the sub-assembly and into a socket in the body of the coupling abutting against a pipe abutment surface or stop. The gasket ring encounters an abutment in its socket in the body as the nut is tightened, wherein tightening of the nut radially compresses the gripping member so that its inwardly directed barbed projections engage the outer surface of a pipe to which the coupling is attached. When the barbs have engaged the pipe, further tightening of the nut causes the pipe to be forced inwardly into the coupling past the pipe abutment surface and towards an abutment shoulder. The longitudinal distance between the pipe abutment surface and the abutment shoulder is generally equal to or greater than the longitudinal travel of the nut from the position at which the barbed projections have gripped the pipe to the final tightened position of the nut. There are also provided abutment surfaces within the body of the coupling or the end of the body, and the nut, that abut inner and outer surfaces of a flange outstanding from the outer end of the compression sleeve.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DESCRIPTION OF THE PREFERRED EMBODIMENT

The following detailed description of the invention refers to the accompanying drawings. Although the description includes exemplary embodiments, other embodiments are possible, and changes may be made to the embodiments described without departing from the spirit and scope of the invention. Wherever possible, the same reference numbers will be used throughout the drawings and the following description to refer to the same and like parts.

Figure 1:
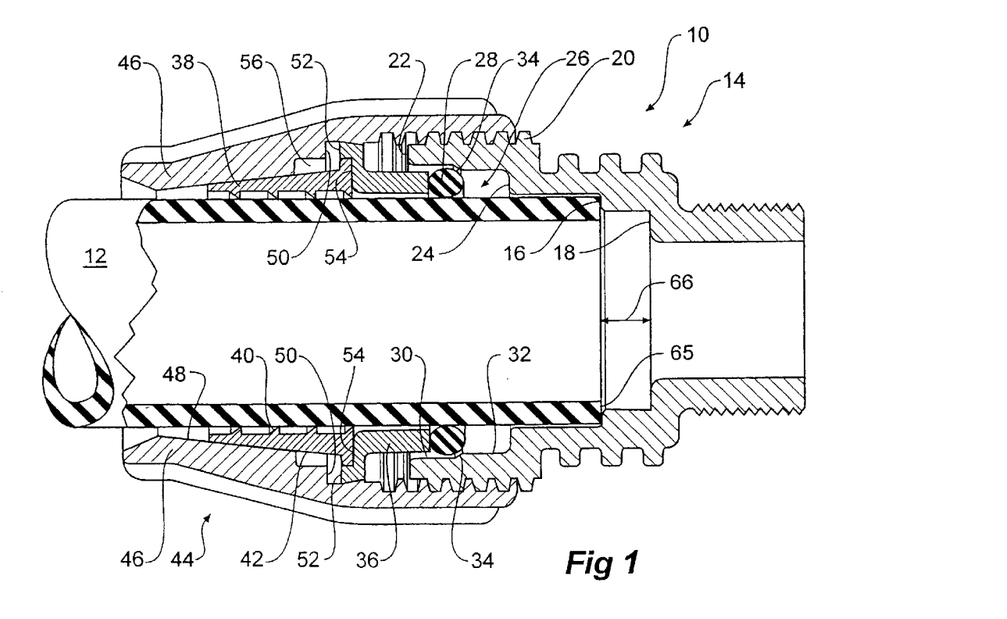
FIG. 1 is a central elevational section that shows a pipe end inserted through a subassembly comprising a nut, gripping member and sleeve, and into a socket in the body of a fitting before the nut being tightened.

Referring first to FIG. 1, there is shown a coupling with an inserted pipe before tightening of the nut. The coupling 10 that engages the outer surface of pipe 12 includes a body 14 that has a pipe abutment surface 16 which is abutted by the end of the pipe 12 when inserted into the coupling as shown in FIG. 1. The body includes a further shoulder 18 whose diameter is smaller than that of the pipe abutment surface 16.

The body 14 has a male thread 20, and between the outer end 22 of the body and the shoulder 18 is a generally annular planar surface 24 which constitutes an abutment surface of a socket or cavity 26 for a resilient gasket ring 28, abutment shoulder 18 of the socket 26 being the inner end of the socket, the socket 26 also having two cylindrical intermediate and axially outer walls 30 and 32 separated by a step 34 (three diameters in all), the diameter of the outer wall 30 exceeding that of the inner wall 32.

Surrounding the pipe 12 is a compression sleeve 36, which carries the resilient gasket ring 28 on its inner end, being fused, bonded, or otherwise affixed to the end of the compression sleeve 36. This could alternatively be engaged by a mechanical tongue and groove or otherwise affixed on the face end of the sleeve 36, and the outer diameter of gasket ring 28 is less than the diameter of outer wall 32 but greater than the diameter of intermediate wall 30, so that the compression sleeve can be readily inserted into the body 14 with the gasket ring 28 being freely movable adjacent wall 32 but requiring compression by axial movement of compression sleeve 36 to enter socket 26.

Adjacent, but axially outwardly of sleeve 36 is a gripping member 38 having radially inwardly, but axially spaced, barb projections 40, and having an outwardly converging tapered surface 42. The gripping member 38 must be radially deformable, and thereby circumferentially deformable, and is typically a split ring.

The nut 44 is provided with a tail 46 having an outwardly converging inner tapered surface 48 the included angle of which is approximately the same as the tapered surface 42 of the gripping member 38, and inwardly from the outer end of tail 46 there is an annular planar shoulder 50 which, upon tightening of the nut 44, will bear against end surface 52 of compression sleeve 36.

The annular surface 54 of the flange at the outer end of sleeve 36 is spaced axially inwardly a short distance from the surface 52.

According to the invention, when the pipe 12 is inserted into the socket 26 of the coupling, as shown in FIG. 1, it abuts against the pipe abutment surface 16. Initial tightening of the nut 44 on the body 14 will not cause abutment of shoulder 50 with annular surface 52 of the sleeve 36. The inner end of the gripping member 38 is loosely contained within a recess 56 in the outer end of sleeve 36, and the gasket ring 28, sleeve 36, and gripping member 38 move in together with the nut 44 since there is a clearance of all portions of the coupling around the polymeric pipe 12 when it is first inserted. However, after the nut 44 travels a short axial distance inwardly the gasket ring 28 is intercepted by the step 34 and will not pass that step until compressed. Continued movement of the nut therefore causes a small axially inward movement of the sleeve 36 and the gripping member 38, and must be accommodated by the sliding of inner surface 48 over the outer tapered surface 42, in turn causing the barb projections 40 of the gripping member 38 to engage the outer surface of pipe 12.

When the barb projections 40 have engaged the pipe, further tightening of the nut 44 causes the pipe 12 to be forced inwardly into the body 14. The longitudinal forces are such that the end of the pipe 12 that abuts abutment surface 16 is compressed and/or deformed so that it travels past surface 16 towards shoulder 18.

Figure 2:
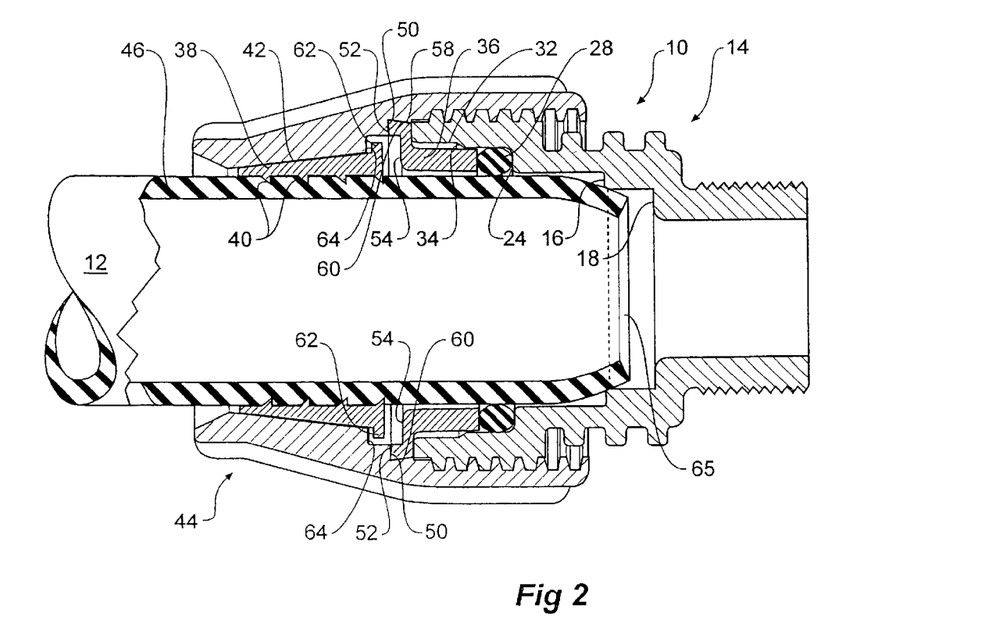
FIG. 2 is a similar section showing the configuration of components and location of the pipe when the nut is tightened onto the body.

Tightening of the nut 44 (generally by rotation in the clockwise direction) also brings the shoulder 50 into abutment with the annular surface 52 of compression sleeve 36 and progresses the sleeve 36 axially inwardly, causing sufficient compression of the gasket ring 28 for it to enter the inner smaller diameter intermediate portion 32 of the socket 26. The socket is of such dimension that the gasket ring 28 effects a satisfactory seal between the body 14 and the pipe 12, and this is further enhanced when the nut 44 is fully tightened so that the two surfaces of the sleeve 36 respectively lie in abutment with the outer end 22 of the body 14 and the shoulder 50 as shown in FIG. 2. At this location, compression of the resilient gasket ring 28 results in a seal, which is effective against very high pressures.

Since the nut cannot be progressed any further inwardly, the compression of both the rings 28 and 38 is controlled to lie within the range dictated by the diameter of the pipe 12. In addition, the longitudinal distance 66 between the abutment surface 16 and shoulder 18 is generally equal to or longer than the longitudinal travel of the nut when the barbed projections have first gripped the pipe.

If the pipe 12 is not inserted into the body 14 and the nut 44 is screwed forwardly, the pipe 12 will not be able to be forced inwardly to the body 14 unless the nut is screwed back to its loose state.

When the nut 44 is screwed back (usually rotation anti-clockwise) the compression sleeve 36 is also pulled back (rearwardly) due to a loose engagement of the reverse tapered surfaces 58 of compression sleeve 36 and 60 of nut 44, and subsequent abutment of compression sleeve 36 against inner end of gripping member 38. Because the gasket ring 28 is attached to the inner end of sleeve 36 that is also withdrawn and does not remain in the small diameter portion of socket 26.

As illustrated in FIG. 2, when sleeve nut 44 is tightened over body 14, radially outstanding flange 62 of gripping member 38 lies adjacent shoulder 64 of nut 44. If a tensile load is applied to pipe 12, and body 14 is fixed, any relative movement will initially impart more radial compression to gripping member 38, but such movement (if any) will be very small, and will be resisted by abutment of flange 62 against shoulder 64.

Simultaneously, as the sleeve 44 is being tightened and the projections 40 engage the pipe the pipe end 65 is forced past the abutment surface 16 towards shoulder 18. When the pipe 12 is being manually inserted it therefore allows the user to appreciate that the pipe is in the correct position within the body 14 whilst there still being sufficient room for further travel of the pipe inwardly due to the tightening of the nut.

It will be appreciated that the assembly may be sold with the components in place and held captive while nevertheless retaining a clearance over the outer surface of pipe 12.

Figure 3:
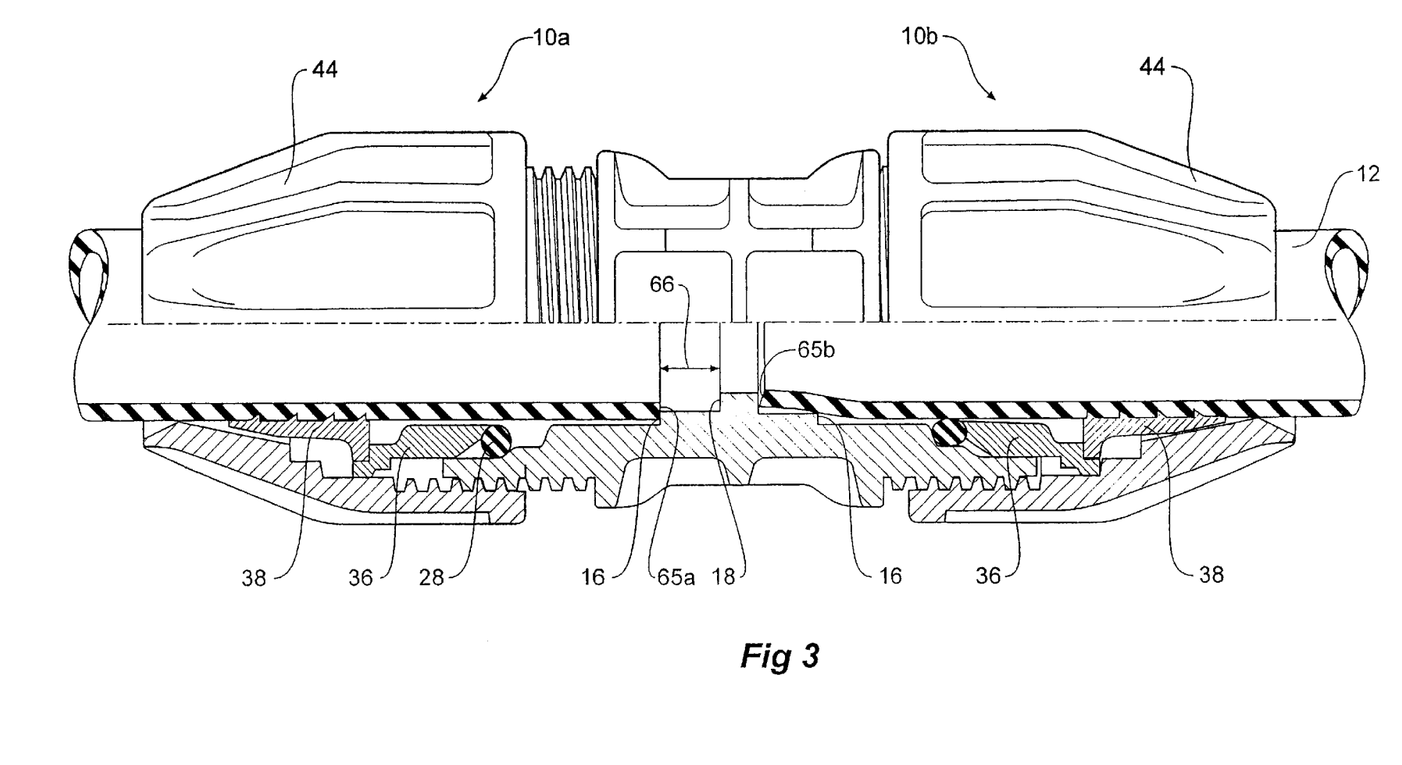
FIG. 3 is a central elevational section showing a dual pipe coupling wherein one side the nut has been tightened and on the other before being tightened.

Illustrated in FIG. 3 is a two-pipe coupling, where the coupling may be used to join two pipes together. As seen in FIG. 3, the left hand side of the coupling 10a has had a pipe inserted and the nut 44 is yet to be tightened with the end of the pipe 65a abutting surface. 16, whilst the end of the other pipe 65b has had the pipe inserted and the nut 44 fully tightened whereupon the pipe end 65b has moved past shoulder 16 and towards the abutment surface 18. In this embodiment, the distance 66 between the surface 16 and the shoulder 18 is generally greater than or equal to the longitudinal travel of the nut 44 when the barbed projections 40 have engaged the pipe 12. Thus when the nut 44 is fully tightened the pipe 12 is positioned generally against or adjacent shoulder 18.

Figure 4:
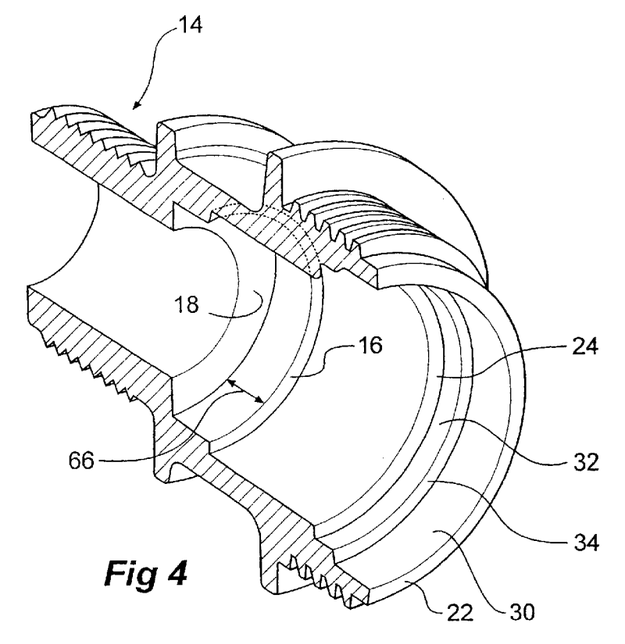
FIG. 4 is a partial perspective cut-away view of a pipe abutment surface according to a first embodiment of the invention.

As illustrated in FIG. 4 where there is shown a cut-away partial perspective view of the body 14, the abutment surface 16 may be an annular step where the distance 66 between the surface 16 and shoulder 18 is greater to or equal to the full travel of the nut. It has also been discovered that the annular step angle to the longitudinal axis of the body may be a right angle for when being tightened the nut produces sufficient longitudinal force that the pipe is forced even beyond the right angle. However, those skilled in the art will appreciate that the angle may be less than 90 degrees, provided that when the pipe is manually inserted, the user feels sufficient resistance to assume that the pipe has been inserted sufficiently deeply into the body.

Figure 5:
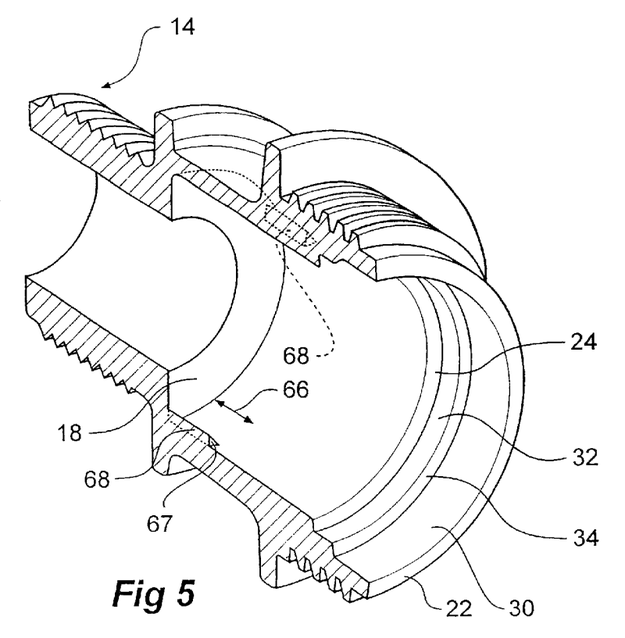
FIG. 5 is a partial perspective cut-away view of a pipe abutment surface according to a second embodiment of the invention.
Figure 6:
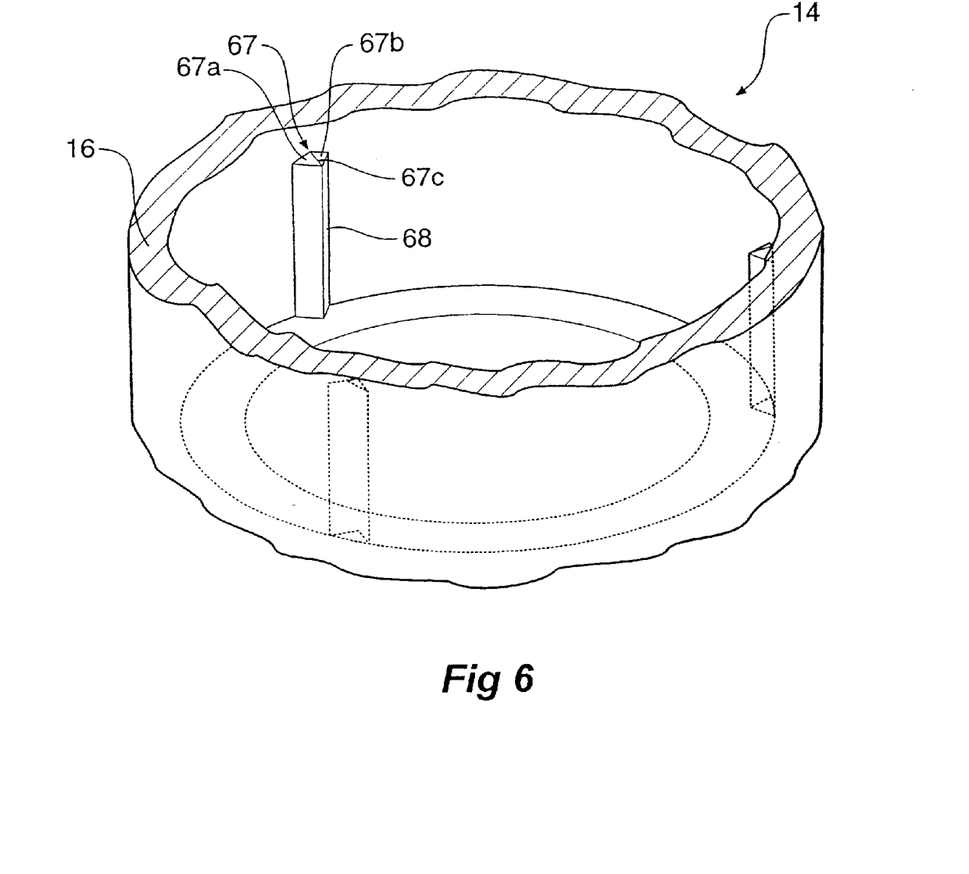
FIG. 6 is a partial perspective cut-away view of a pipe abutment surface according to a third embodiment of the invention.
Figure 7:
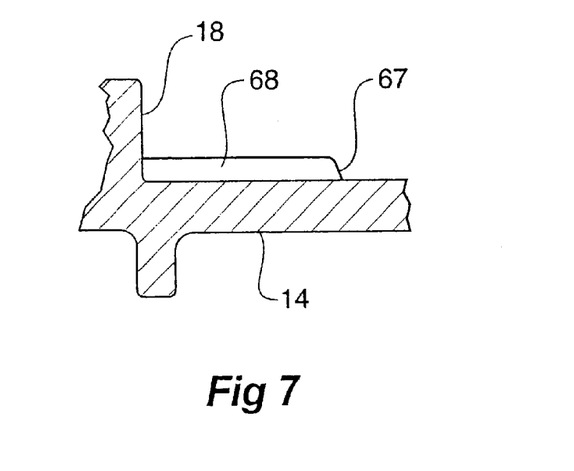
FIG. 7 is a detailed view of the pipe abutment surface of FIG. 6.

Of course, those skilled in the art will readily appreciate that the pipe abutment surface need not be a solid annular ring as illustrated in FIG. 4, but could equally well be a plurality of projections symmetrically circumferentially disposed within the body 14 and positioned before the abutment surface 18. This is illustrated in FIG. 5 where the abutment surface 16 is defined by three wedges 68 located at 120-degree intervals within the body of the pipe. The length of the wedges is equal to the length 66 being equal to or greater than the travel of the nut when fully tightened.

Whilst FIGS. 4 and 5 illustrated the abutment surface having a generally right angle to the longitudinal axis of the body, the front face 67 of the wedges may be tapered to enable for easier movement of the pipe towards the shoulder 18 when the nut is being tightened. The angle has to be chosen so that when the pipe is being manually inserted it is not easily possible to push the pipe past the faces 67 so that the user feels as if the pipe has been sufficiently inserted into the body. However, it has been discovered that even angles of around 45 degrees are sufficiently steep to provide an abutment surface 16 against which a pipe abuts when manually inserted. Thus, as illustrated in this embodiment the surface 67 includes two faces 67a and 67b whose apex 67c is at an angle of some 70 degrees to the longitudinal axis of the body.

It is to be understood that where the abutment surface 16 is defined by individual projections, the number of projections is not necessarily three, and there may be more projections. In addition, in such an arrangement, the angle of the front faces of the wedges that define the surface 16 may vary for different projections. Thus some of the projections may be right-angled whilst other at a much gentler angle. The body of the pipe between the surface 16 and shoulder 18 may also be of a non-smooth configuration to assist in preventing the pipe from rotational motion when the nut is being tightened.

Figure 8:
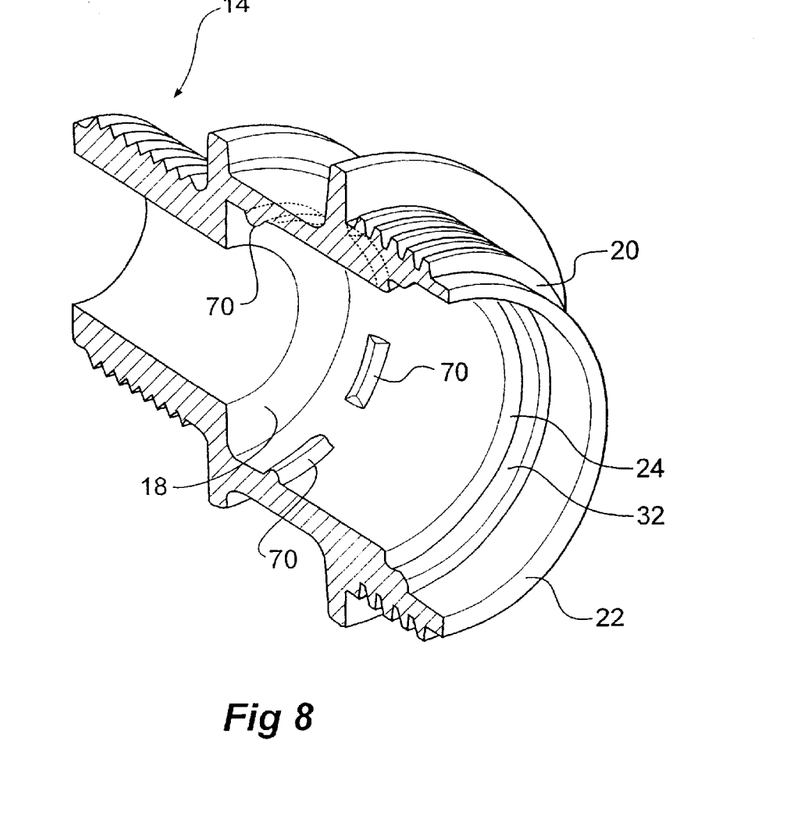
FIG. 8 is a partial perspective cut-away view of a pipe abutment surface according to a fourth embodiment of the invention.
Figure 9:
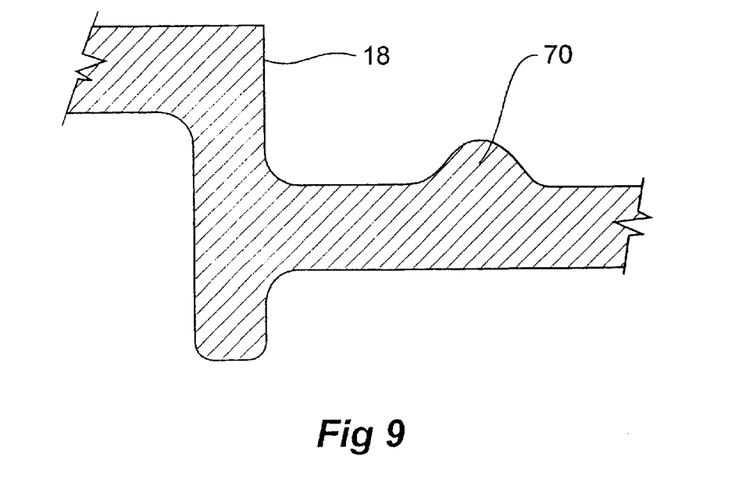
FIG. 9 is a cross-sectional view of one of the projections of FIG. 8.

Another alternative embodiment includes varying the total length or orientation of the projections. Referring now to FIG. 8, there is shown a plurality of projections 70 at right angles to the longitudinal axis of the body. The projections are preferably hump or arcuate shape in their cross-section, as shown in FIG. 9, the configuration being such that a pipe will still abut against the projections when manually inserted but will still enable the pipe to pass the projections when under the force exerted by tightening of the nut.

Some of the projections 70 may not extend all the way to the shoulder 18 so that when the pipe reaches the shoulder it expands outwardly and springs back into its natural shape. Similarly, with a solid annular abutment surface as illustrated in FIGS. 1 and 2, the diameter of the pipe 12 between the surface 16 and the shoulder 18 may be equal to that before the shoulder. Thus when the pipe has been forced past the surface 16 its diameter increases so that the end of the pipe is not caused to deform to the same degree.

Those skilled in the art will readily appreciate that there are many alternative constructions of surface 16. As discussed above it may be formed by a annular shoulder in the body of the coupling or by including discrete projections whose size, shape and orientation provides a sufficient surface area so that when a user inserts a pipe into the body they know that they have inserted the pipe as far is necessary whilst there still being sufficient room to accommodate further movement of the pipe into the coupling when tightening of the nut.

It is also to be understood whereas the above description discusses a coupling having a particular configuration it is not intended to limit the present invention to such a coupling and other pipe couplings may be included in the present invention. For example, the present invention may equally well be applied in a coupling as defined in Applicant's Australian Patent 707930. In that invention, the sleeve of the coupling is dispensed with and a spigot includes an annular flange that acts on the gasket to provide a seal under tightening of the nut. The abutment surfaces the subject of the present invention could very well be located on the spigot so that the pipe can still move axially inwardly.

It is therefore intended that the present invention can be applied to all pipe couplings of the type where a nut is used to drive a grip ring that in turn engages and axially forces the pipe further into the body of the coupling. The present invention thus solves the problem of the end of such a pipe being deformed due to no remaining longitudinal space for the pipe to travel through.

Without departing from the spirit and scope of the invention, one of ordinary skill can make various changes and modifications to the invention to adapt it to various usages and conditions. As such, these changes and modifications are properly, equitably, and intended to be, within the full range of equivalence of the following claims.

What is claimed is:

1. A pipe coupling, comprising:

a body having an external thread and annular inner surfaces defining a socket within said body of larger outer diameter at an outer end than at an intermediate location of said socket, said socket being adapted to receive a pipe therein;

a nut having an internal thread at an inner end thereof engaging said body external thread, whereby said nut moves axially relative to said body from a first nut position to a second nut position, said nut including an inwardly facing abutment surface between ends of said nut and an outwardly converging internal circular surface between said abutment surface and an outer end of said nut;

a substantially non-deformable first stop extending at least partially around said body annular inner surface in said intermediate location of said socket at a position offset from the end of said intermediate location where said end is distal from said outer end, said first stop being adapted to contact an end of said pipe when said pipe is inserted into said socket at a first pipe position and partially restrict axial movement of said pipe when said pipe abuts said first stop, whereby the axial force required to move said pipe beyond said first stop is substantially greater than the force required to manually insert said pipe into the socket intermediate part;

a substantially non-deformable second stop extending at least partially around said body annular inner surface in said intermediate location of said socket at a position distal from said first stop, said second stop being adapted to contact said end of said pipe when said pipe is moved axially to a second pipe position and substantially restrict axial movement of said pipe when said pipe abuts said second stop;

an annular sleeve having an abutment surface at its outer end co-operable with said nut abutment surface, and a resilient gasket secured to its inner end;

a deformable gripping member having an outwardly converging outer surface complementary to said outwardly converging internal nut surface, said gripping member having an internal surface with barbs extending radially inwardly therefrom;

the internal diameters of said socket inner end, sleeve and gripping member all being slightly greater than an external diameter of said pipe such that said end of said pipe is freely insertable through said socket outer end and said gripping member and into said socket intermediate part until it abuts said first stop, wherein tightening of said nut over said external thread at said first nut position causes axial movement of said gasket ring, sealable engagement of said gasket ring and said body, and radially inward deformation of said gripping member such that the said barbs engage said pipe, and wherein further tightening of said nut over said external thread to said second nut position, wherein said nut abutment surface abuts said annular sleeve abutment surface, causes axial movement of said pipe from said first pipe position to said second pipe position, "wherein the first and second stops are substantially vertical with regard to the longitudinal axis of the body, and wherein the distance between said first and second pipe positions is greater than the distance between said first and second nut positions."

2. The pipe coupling of claim 1, wherein said first stop comprises an annular abutment surface extending circumferentially around said annular inner surface.

3. The pipe coupling of claim 1, wherein said first stop comprises a plurality of projections positioned circumferentially and symmetrically around said inner annular surface.

4. The pipe coupling of claim 3, wherein there are at least three of said projections disposed 120 degrees angularly to each other.

5. The pipe coupling of claim 3, wherein said projections are wedge shaped projections whose longitudinal direction extends in the longitudinal direction of said coupling, said wedge shaped projections having a front face.

6. The pipe coupling of claim 5, wherein said front surface of said wedge shaped projections facing the outer end is disposed at an angle other than a right angle but greater than 45 degrees to the longitudinal axis.

7. The pipe coupling of claim 6, wherein said front surface has at least two faces whose angle to the longitudinal axis is less than 90 degrees.

8. The pipe coupling of claim 3, wherein said projections are wedge shaped projections whose longitudinal direction extends generally perpendicular to the longitudinal direction of said coupling.

9. The pipe coupling of claim 8, wherein said wedge shaped projections are of an arcuate shape.

10. A pipe coupling wherein a pipe is freely insertable into one end of the coupling, comprising:

a body having annular inner surfaces and external threads;

a nut having internal threads adapted to engage said body, whereby said nut moves axially relative to said body from a first position to a second position, said nut including an abutment surface;

a grip ring disposed within said body and of a shape and configuration that rotation of said nut causes said grip ring to move in the axial direction, said grip ring including an abutment surface, said grip ring having projections adapted to engage said pipe when said nut is tightened at said first nut position and having an end adapted to engage a gasket and move said gasket into a sealing cavity when said nut is tightened, wherein said body includes an abutment surface located at a position away from the ends of said body to provide a guide to the user when manually inserting said pipe freely into said coupling, said abutment surface defining a substantially non-deformable first stop that is adapted to contact a free end of said pipe at a first pipe position and partially restrict axial movement of said pipe when said pipe abuts said first stop, whereby the axial force required to move said pipe beyond said first stop is significantly greater than the force required to manually insert said pipe into said coupling, said first stop being further shaped and configured such that under rotation of said nut said pipe is caused to move over said first stop and further into said coupling, said body further including a second stop disposed at a position distal from said first stop that is adapted to contact said free end of said pipe at a second pipe position and substantially restrict further axial movement of said pipe when said pipe abuts said second stop, wherein the first and second stops are substantially vertical with regard to the longitudinal axis of the body, and wherein the distance between said first and second pipe positions is greater than the distance between said first nut position and said second nut position, wherein said nut abutment surface abuts said grip ring abutment surface.

* * * * *